United States Patent
Schmid et al.

(10) Patent No.: US 10,454,146 B2
(45) Date of Patent: Oct. 22, 2019

(54) HEAT EXCHANGER COMPONENT

(71) Applicant: Mahle Behr GmbH & Co. KG, Stuttgart (DE)

(72) Inventors: Caroline Schmid, Stuttgart (DE); Michael Moser, Rainau (DE); Nikolaus Daubitzer, Stuttgart (DE); Heiko Neff, Auenwald (DE); Dominique Raible, Rottenburg (DE); Alexandra Schnaars, Marbach (DE); Volker Schall, Hemmingen (DE); Nic Sautter, Plochingen (DE); Stefan Hirsch, Stuttgart (DE)

(73) Assignee: MAHLE BEHR GMBH & CO. KG (DE)

( * ) Notice: Subject to any disclaimer, the term of this patent is extended or adjusted under 35 U.S.C. 154(b) by 824 days.

(21) Appl. No.: 14/783,429

(22) PCT Filed: Mar. 27, 2014

(86) PCT No.: PCT/EP2014/056209
§ 371 (c)(1),
(2) Date: Oct. 8, 2015

(87) PCT Pub. No.: WO2014/166757
PCT Pub. Date: Oct. 16, 2014

(65) Prior Publication Data
US 2016/0056511 A1    Feb. 25, 2016

(30) Foreign Application Priority Data

Apr. 12, 2013 (DE) .................. 20 2013 004 978 U
May 29, 2013 (DE) .................. 10 2013 210 094

(51) Int. Cl.
F25B 29/00    (2006.01)
H01M 10/65    (2014.01)
(Continued)

(52) U.S. Cl.
CPC ............ *H01M 10/65* (2015.04); *B23P 15/26* (2013.01); *F28C 3/005* (2013.01); *F28D 9/0031* (2013.01);
(Continued)

(58) Field of Classification Search
CPC ........... H01M 10/65; H01M 10/65615; H01M 10/625; H01M 10/613; H01M 10/6554;
(Continued)

(56) References Cited

U.S. PATENT DOCUMENTS 7,207,377 B2 * 4/2007 Sonoda ............... F28D 1/05383
165/133
8,205,702 B2 * 6/2012 Hoermandinger ....... B60K 6/28
180/68.1
(Continued)

FOREIGN PATENT DOCUMENTS

DE    102006010221 A1    11/2006
DE    102008059952 A1    6/2010
(Continued)

OTHER PUBLICATIONS

English abstract for DE-102011075820.
English abstract for DE-102008059952.
English abstract for DE-102011003296.

*Primary Examiner* — Claire E Rojohn, III
(74) *Attorney, Agent, or Firm* — Fishman Stewart PLLc

(57) ABSTRACT

A heat exchanger component of a temperature control system of an electrical energy store may include a carrier material and at least two layers. The at least two layers may include a first layer composed of an electrically insulating material and a second layer that may facilitate temperature control via at least one of cooling and heating the electrical energy store.

20 Claims, 4 Drawing Sheets

(51) Int. Cl.

| | | |
|---|---|---|
| *H05B 3/22* | (2006.01) | |
| *H01M 10/625* | (2014.01) | |
| *H01M 10/615* | (2014.01) | |
| *H01M 10/653* | (2014.01) | |
| *H01M 10/6556* | (2014.01) | |
| *H01M 10/6571* | (2014.01) | |
| *H01M 10/6551* | (2014.01) | |
| *H01M 10/6554* | (2014.01) | |
| *H01M 10/613* | (2014.01) | |
| *F28D 9/00* | (2006.01) | |
| *F28C 3/00* | (2006.01) | |
| *H05B 3/74* | (2006.01) | |
| *B23P 15/26* | (2006.01) | |
| *F28D 21/00* | (2006.01) | |

(52) U.S. Cl.
CPC ........ *F28D 9/0043* (2013.01); *H01M 10/613* (2015.04); *H01M 10/615* (2015.04); *H01M 10/625* (2015.04); *H01M 10/653* (2015.04); *H01M 10/6551* (2015.04); *H01M 10/6554* (2015.04); *H01M 10/6556* (2015.04); *H01M 10/6571* (2015.04); *H05B 3/22* (2013.01); *H05B 3/748* (2013.01); *F28D 2021/0028* (2013.01); *H05B 2203/023* (2013.01)

(58) Field of Classification Search
CPC ........... H01M 10/6571; H01M 10/6556; B23P 15/26; H05B 3/748; H05B 3/22; H05B 2203/023; F28D 9/0031; F28D 9/0043; F28D 2021/0028; F28C 3/005
USPC .......................................................... 165/61
See application file for complete search history.

(56) References Cited

U.S. PATENT DOCUMENTS

| | | | | |
|---|---|---|---|---|
| 9,316,450 B2* | 4/2016 | Engelhardt | ............... | F28F 9/02 |
| 9,318,782 B2* | 4/2016 | Hirsch | ............... | H01M 10/625 |
| 2002/0110173 A1* | 8/2002 | di Sopra | ................ | H01S 5/423 |
| | | | | 372/46.01 |
| 2003/0103543 A1* | 6/2003 | Moser | ................ | H01S 5/18358 |
| | | | | 372/96 |
| 2011/0189526 A1* | 8/2011 | Michelitsch | ........ | H01M 2/1077 |
| | | | | 429/120 |
| 2011/0300421 A1* | 12/2011 | Iritani | ................ | H01M 10/625 |
| | | | | 429/72 |
| 2012/0107663 A1* | 5/2012 | Burgers | .................... | F28F 3/06 |
| | | | | 429/120 |
| 2012/0156542 A1* | 6/2012 | Schaefer | ............. | H01M 10/647 |
| | | | | 429/120 |
| 2012/0241138 A1* | 9/2012 | Kohlberger | ............. | H01M 2/34 |
| | | | | 165/185 |
| 2013/0011705 A1* | 1/2013 | Hirsch | ................ | H01M 10/625 |
| | | | | 429/72 |
| 2013/0014915 A1* | 1/2013 | Hirsch | ...................... | F28F 9/02 |
| | | | | 165/104.19 |
| 2014/0090803 A1* | 4/2014 | Schmid | ..................... | F28F 3/08 |
| | | | | 165/76 |
| 2014/0090810 A1* | 4/2014 | Schmid | ..................... | F28F 3/12 |
| | | | | 165/104.19 |
| 2014/0090811 A1* | 4/2014 | Schmid | ..................... | F28F 3/00 |
| | | | | 165/104.19 |
| 2014/0090812 A1* | 4/2014 | Schmid | ..................... | F28F 1/00 |
| | | | | 165/104.19 |
| 2014/0090813 A1* | 4/2014 | Schmid | ................... | F28F 13/06 |
| | | | | 165/104.19 |
| 2014/0090823 A1* | 4/2014 | Moser | ...................... | F28F 9/00 |
| | | | | 165/169 |
| 2014/0220397 A1* | 8/2014 | Hirsch | .................... | H01G 11/18 |
| | | | | 429/62 |
| 2014/0251310 A1* | 9/2014 | Muren | ................... | F28F 13/003 |
| | | | | 126/618 |
| 2014/0287291 A1* | 9/2014 | Miyawaki | ........... | H01M 2/1077 |
| | | | | 429/120 |
| 2014/0302371 A1* | 10/2014 | Miyawaki | ........... | H01M 10/647 |
| | | | | 429/120 |
| 2015/0249278 A1* | 9/2015 | Park | ...................... | H01M 2/206 |
| | | | | 429/82 |
| 2015/0283874 A1* | 10/2015 | Seitz | ................... | B60H 1/00271 |
| | | | | 62/118 |
| 2015/0354905 A1* | 12/2015 | Moser | ................... | F28F 21/065 |
| | | | | 165/177 |
| 2016/0003383 A1* | 1/2016 | Zeko | ................. | B01L 3/502715 |
| | | | | 435/305.1 |

FOREIGN PATENT DOCUMENTS

| | | |
|---|---|---|
| DE | 102009005854 A1 | 7/2010 |
| DE | 102009042270 A1 | 3/2011 |
| DE | 102011003296 A1 | 8/2012 |
| DE | 102011075820 A1 | 11/2012 |
| DE | 102011084002 A1 | 4/2013 |
| EP | 0806805 A1 | 11/1997 |
| WO | WO-03/103083 A2 | 12/2003 |

* cited by examiner

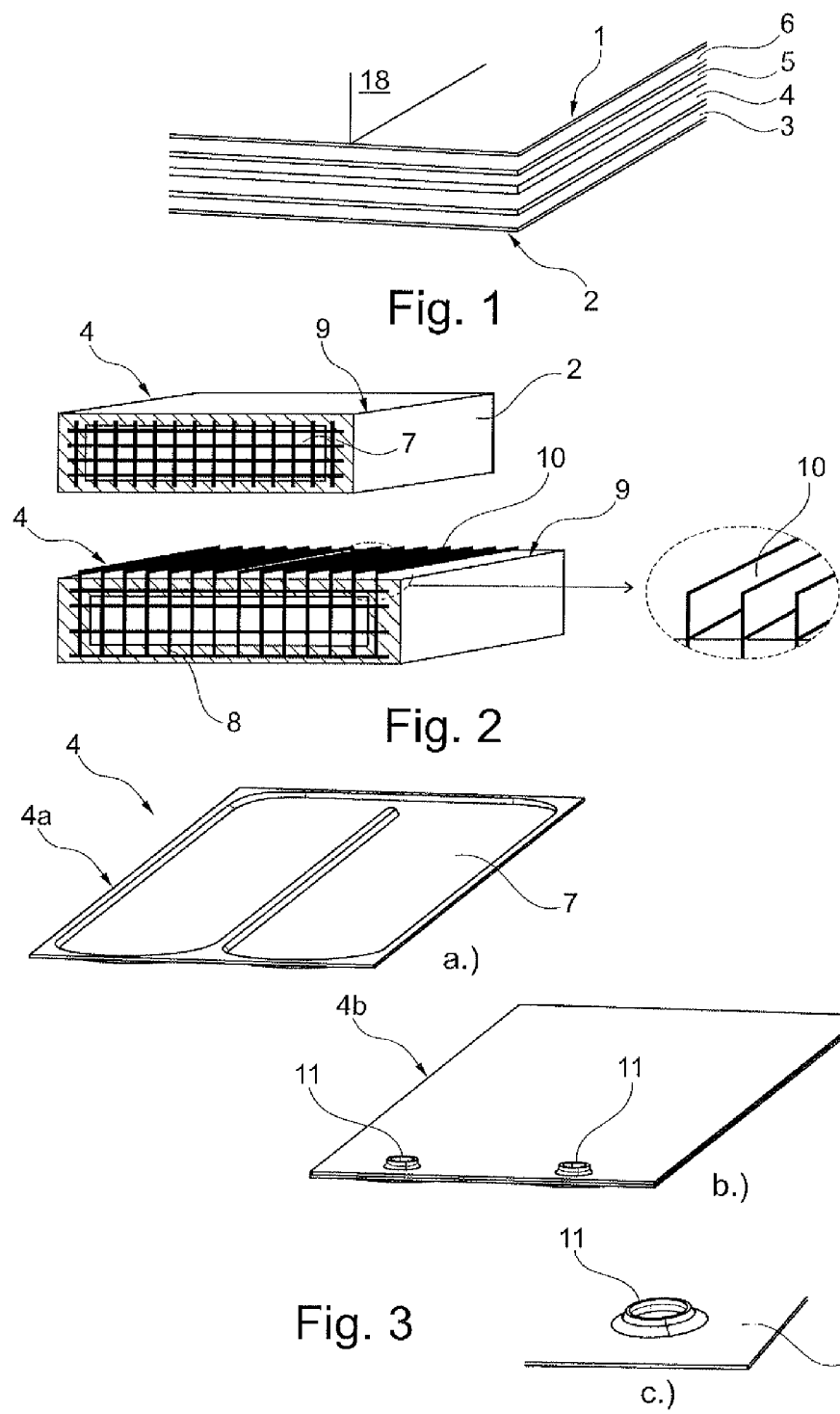

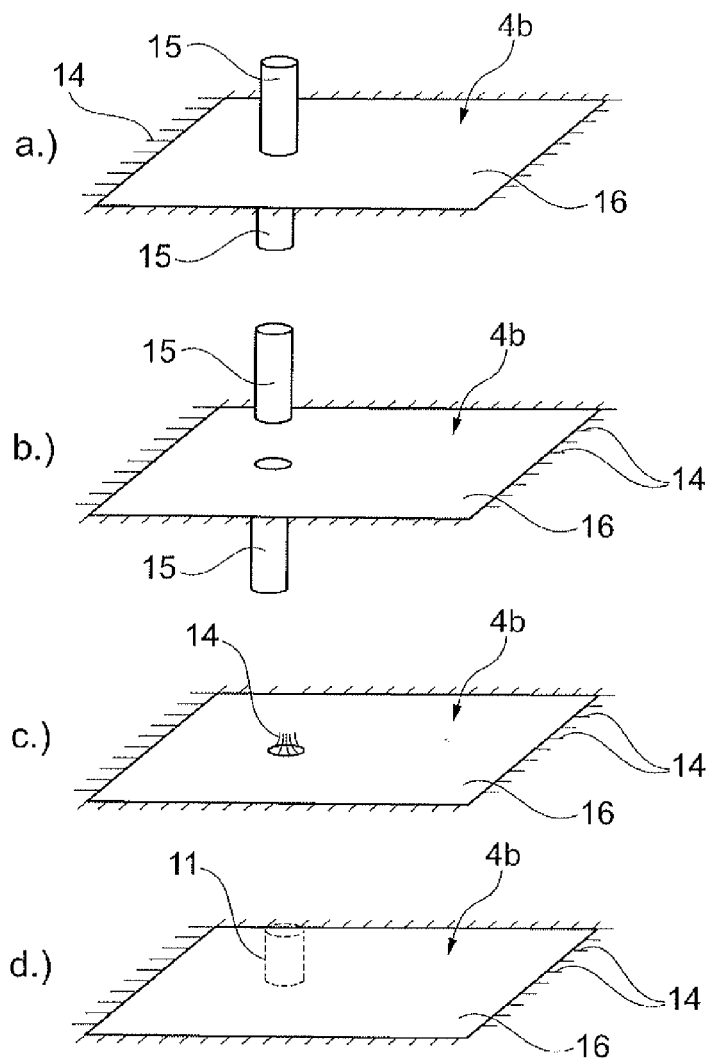
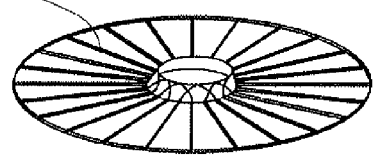
Fig. 7
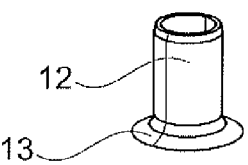
Fig. 8
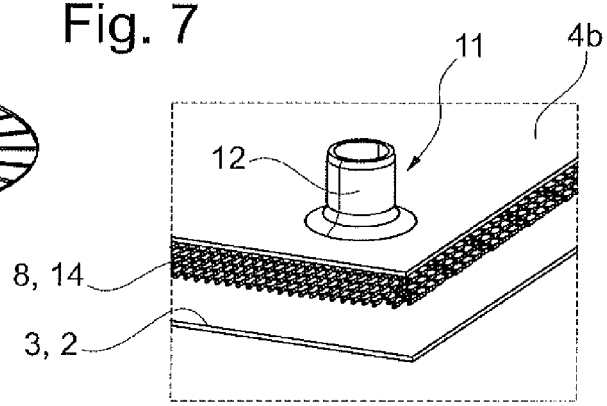
Fig. 9

HEAT EXCHANGER COMPONENT

CROSS-REFERENCE TO RELATED APPLICATIONS

This application claims priority to German Patent Application No. 20 2013 004 978.2, filed Apr. 12, 2013, German Patent Application No. 10 2013 210 094.9, filed May 29, 2013, and International Patent Application No. PCT/EP2014/056209, filed Mar. 27, 2014, all of which are hereby incorporated by reference in their entirety.

TECHNICAL FIELD

The present invention relates to a heat exchanger component of a temperature control system of an electrical energy store. The invention also relates to an electrical energy store having a heat exchanger component of said type, and to a method for producing a heat exchanger component of said type.

BACKGROUND

For controlling the temperature of batteries of modern hybrid and electric vehicles, use is commonly made of the cooling plates through which fluid flows, and/or of an additional heater. Owing to the generally better heat conduction characteristics, said cooling plates are normally produced from metallic or electrically conductive materials. As the battery cells that are used normally have a housing composed of a metallic material, additional electrical insulation is required between the cooling plates and the battery cells in order to prevent short-circuits and leakage currents. To be able to ensure said insulation, thin plastics foils or applied layers composed of thermally conductive material, such as for example silicone, are normally used. The application of such insulation layers however normally involves considerable outlay, for example for preparation, cleaning and particle elimination, wherein coatings composed of silicone are normally very expensive and pose problems in terms of processing owing to their viscous characteristics. Furthermore, a curing time is required, which has an adverse effect on production costs.

SUMMARY

An additional heater necessitates an additional component or an additional coating, which, similarly to the abovementioned insulation layer, must be applied or integrated as an additional, external component in the cooling circuit. This gives rise to further costs, wherein said solution is furthermore disadvantageous with regard to the available installation space. Therefore, for a heat exchanger component of the generic type, the present invention is concerned with the problem of specifying an improved or at least alternative embodiment which in particular eliminates, or at least reduces, the disadvantages known from the prior art.

Said problem is solved according to the invention by means of the subject of the independent claims. The dependent claims relate to advantageous embodiments.

The present invention is based on the general concept whereby a previously known cooling plate of a temperature control system of an electrical energy store, with for example additional heating layers, is according to the invention now formed as a multi-layer heat exchanger component, wherein each layer is now assigned a dedicated function. According to the invention, therefore, the heat exchanger component is thus formed from a carrier material and at least two layers, of which a first layer has an electrically insulating action and a second layer permits temperature control, that is to say cooling and/or heating, of the electrical energy store. The electrically insulating layer, which purely theoretically may also be formed by the carrier material itself, permits a direct coupling of the heat exchanger component to a housing of the energy store or to battery cells thereof, whereby furthermore, a compact design and optimum heat exchange, in particular cooling, can be achieved. Owing to the multi-layer construction of the heat exchanger component according to the invention, it is furthermore possible to eliminate the hitherto required separate and cumbersome application of the insulating plastics foil, which yields considerable advantages with regard to the manufacturing process.

The multi-layer construction of the heat exchanger component according to the invention furthermore allows said heat exchanger component to be manufactured entirely separately, specifically furthermore in a manner adapted to individual requirements, such that in general, it is possible to produce heat exchanger components which optimally satisfy respective requirements by way of an individually set number of layers or an individually set layer construction. Furthermore, the heat exchanger component according to the invention provides the manufacturer with an extremely great amount of freedom with regard to shaping, with a simultaneous reduction in weight and costs.

In one advantageous refinement of the solution according to the invention, the carrier material has fiber-reinforced plastic, wherein the carrier material may for example be in the form of an organic sheet, a fiber-reinforced tape or fiber-reinforced organic sheet, or a plastics laminate with integrated metal layers, in particular reinforcement layers for mechanical stiffening. As fibers, use may be made here in particular of carbon fibers, aramide fibers or glass fibers, or else fiber mats and nonwovens, such as for example rovings. Such fiber mats are well known for example from the field of plastics mold construction. The fibers themselves may be short, long or in the form of endless fibers, wherein the fibers themselves, owing to their relatively high tensile strength, can yield considerable stiffening of the heat exchanger component according to the invention, while at the same time being of extremely low weight. Here, it is generally also possible for layers to be constructed with multiple so-called tapes, wherein the individual tapes may be filled with different fibers or functional materials. In this way, it is possible for individual functions, such as for example mechanical strength, heating, insulation and diffusion sealing, to be distributed in order thereby to firstly obtain optimum variability in achieving the requirements and secondly limit costs by virtue of the layered construction being assembled in accordance with requirements and with the maximum required effectiveness.

The integration of functional materials may in this case be performed already during the production of semifinished products of, for example, fiber-reinforced composite materials or prepregs, such as for example organic sheets or tapes. In this way, it is possible for subsequent shapes for example for fluid guidance, such as for example fluid ducts, to already be prefabricated, whereby the subsequent shaping process required for these can be dispensed with. Possible production methods are in this case in particular weaving or knitting of the fibers, which are then, in a further working step, surrounded by the carrier material, for example a plastics matrix. Furthermore, it is also possible for such structures to be composed of a metallic or thermally conductive material (for example in the form of nonwovens, knits, lattices or deformed parts) and to generate corresponding fluid guidance retroactively by way of molded-on or overmolded plastics surfaces or shaped plastics parts. Furthermore, it is also possible for the abovementioned functionalization to be realized by way of so-called hybrid nonwovens, composed of different fiber materials.

It is furthermore conceivable for said structures to also penetrate through the applied plastics surface and come into direct contact with the component for cooling, that is to say for example the electrical energy store. This would considerably improve the heat exchange in relation to a plastics surface. In a further refinement, it would be possible for the components penetrating through to be in contact with the exterior surroundings and to thereby cool the cooling fluid or cooling medium situated in the interior of the heat exchanger component. In this way, further utilization of the heat exchanger component according to the invention with a reversed heat conduction path is possible. Here, if the elements penetrating through are correspondingly shaped with a large surface structure, this improves the heat exchange with the exterior surroundings. In particular, it is thus possible, in an advantageous refinement of the heat exchanger component according to the invention, for the second layer to have an enlarged surface, formed for example by spikes or fins.

It is expediently provided that the second or a further layer has fluid ducts through which a heat exchanger fluid or a heat exchanger medium can flow. In general, the multi-layer construction thus serves for the integration of a duct system for the heat exchanger medium, which duct system is preferably in direct heat-exchanging contact with the electrical energy store whose temperature is to be controlled. The shaped fluid ducts may in this case additionally comprise elements for increasing mechanical strength, which elements are composed for example of metal or of plastic and, during the manufacturing process, are inlaid and/or incorporated in form-fitting or cohesive fashion into the carrier material.

In general, it is also possible for connection pieces which are integrally formed on, in particular molded onto, the second layer to be provided for the purposes of supply/discharge of heat exchanger fluid to/from the second layer, wherein said fluid guide, which is not formed directly out of the layer construction, may be composed of a wide variety of materials, for example plastic, metal or foamed material. The manufacture of the external fluid guide, such as for example connection pieces, may be realized inter alia by way of the following manufacturing methods: injection molding (molding-on/overmolding, deformation in the injection-molding tool, special methods, such as for example gas injection, fluid injection), adhesive bonding, thermoforming, punching, blow molding, chip-removing cutting or die casting. A further possibility is the stamping or pressing of so-called organic sheets into particular shapes. In this way, it is possible for a planar surface to be formed on one side and for a fluid guide to be formed, without the need for additional material, on the other side. This is realized in that existing matrix material is forced out of the fiber-reinforced composite material into corresponding cavities of a stamping/pressing tool. This eliminates the need for the additional molding-on process step, or for additional components and/or material.

If, by means of the pressing/stamping of the so-called organic sheet, structures are to be generated for which there is insufficient matrix material, the amount of matrix can be increased through the introduction of additional material. For this purpose, the additional material may be introduced in the form of a foil or as granulate. It would likewise be conceivable for a melt to additionally be introduced. Foils composed of the corresponding matrix material may be applied either directly during the production process of the organic sheet or in an additional process step or in a manner integrated into the pressing/stamping of the organic sheet.

Granulate or ground pieces of the corresponding matrix material may be introduced into the pressing/stamping tool by a variety of methods: manually by way of a dosing system or by way of a shaking function in the pressing/stamping tool with an extractor apparatus. In the case of a manual feed, the individual granulate bodies are introduced in a defined number into the respective tool depressions provided for the same, which tool depressions form the desired structure during the subsequent pressing/stamping process. By means of the dosing system, a defined amount of granulate can be dosed and pre-sorted in order for said granulate to subsequently be introduced into the depressions provided in the tool in a manually or automatically initiated manner during the process. Furthermore, it is possible for an undefined amount of granulate bodies to be applied to the pressing/stamping tool half which comprises the depressions, such that, by way of a shaking function, the individual granulate bodies fall into the depressions. Subsequently, by way of an extractor apparatus, the excess granulate is removed from the surface of the pressing/stamping tools, is collected by way of a collecting apparatus, and is supplied back to the process again.

It is furthermore possible to use rotary table or sliding table technology in order to realize or improve accessibility to the tool for the feed of the granulate. Aside from foils and granulate, it is also possible, as mentioned above, for the additional material to be fed in the form of a melt to the pressing/stamping tool. In this case, the so-called organic sheet is placed into the pressing/stamping tool and the desired structure is formed by way of the injection stamping process.

Furthermore, in the shaping process, it is additionally possible for a connection piece-like opening to be integrally formed on, which offers the possibility of reinforcement of a connection piece (inlet or outlet) that is molded on or joined on at a later point in time, or the integrally formed-on connection piece-like opening may itself constitute said inlet or outlet. An advantage of this method is the orientation of the fibers in the mechanically relatively highly loaded transition from the heat exchanger component into the respective connection geometry. To achieve an even better fiber orientation and in order for a retroactively molded-on connection piece geometry to be connected to the heat exchanger component in an even more effective manner, it is for example possible for an organic sheet to be provided, already during the production process, with a recess which is not provided with the carrier material. Said recess may be kept free for example by way of a punch. It is subsequently possible for the exposed fibers to be cut through, and, by shaping, to constitute the projection of the connection piece, with plastic subsequently being molded onto the fibers. In this way, it is also possible for further components, such as for example positioning lugs and fastening elements, to be integrated. It is likewise possible for the connection piece to be retroactively attached to a hole situated in the layer construction, for example by overwelding, adhesive bonding, injection molding or the like. The hole may be produced in the layer construction both during the production of the layer construction and by way of retroactive mechanical machining Furthermore, components with for example tubular geometries with disk-shaped base may be integrated, in the form of an inlet or outlet connection piece, into the layer construction and fixed to a heat exchanger component by way of above-stated method. The integration of the electrically insulating layer is realized by way of the material itself, for example by way of the carrier material, wherein integration of a heater is performed for example by the introduction of metal layers, which can carry electrical current, between individual layers of the carrier material. It is however self-evidently also conceivable for a foil to be introduced or for a print to be applied to the carrier material or for conductive fibers to be used. By means of the latter additional materials in particular, the heat transfer through the layer construction can be improved, and thus cooling performance optimized, as the materials used in this construction generally make it possible to realize a smaller wall thickness. Furthermore, the carrier material may be enriched with particles for improving heat transfer, for example metal particles. By means of the individually selectable layer construction, it is furthermore possible for only certain layers to be filled with such particles, for example in order for the reduction in mechanical strength resulting from said particles to be compensated for by way of other layers.

Furthermore, it is also possible for further layers to be used for diffusion sealing with respect to media in the heat exchanger, wherein it is self-evidently also possible for additional compaction of the plastics layers to be implemented by way of for example chemical, chemical-electrical or physical (plasma) methods. Through the selection of corresponding plastics for the carrier material and/or for the material of further layers, it is also possible to realize a membrane function with targetedly directed diffusion, for example from the surface of the heat exchanger component into the latter itself and onward into a cooling medium flowing therein. By means of the individually freely selectable layer construction, the temperature control of the electrical energy store, in particular the cooling thereof, can be made variable and highly flexible. Individual layers may in this case may be produced or omitted in a wide variety of combinations in a manner dependent on the requirements.

With the heat exchanger component according to the invention, it is possible in particular to dispense with the hitherto cumbersome electrical insulation and reduce the outlay for additional components and machining steps, whereby costs and weight can be lowered.

Further important features and advantages of the invention will emerge from the subclaims, from the drawings, and from the associated description of the figures on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference signs are used to denote identical or similar or functionally identical components.

BRIEF DESCRIPTION OF THE DRAWINGS

In the drawings, in each case schematically:

FIG. 1 is a schematic sectional illustration through a heat exchanger component according to the invention which has multiple layers, FIG. 2 shows a further embodiment of the heat exchanger component according to the invention in a fluid duct, and of a heat-conducting structure and of an enlarged surface for improved heat exchange, FIG. 3a shows a further possible embodiment of a layer of the heat exchanger component according to the invention with integrated fluid duct, FIG. 3b shows an illustration as in FIG. 3a, from the other side, FIG. 3c is a detail illustration of a connection piece integrally formed onto the layer, FIGS. 7a to 7d show possible method steps for the production of a connection piece, or of an inlet or an outlet, in a layer of the heat exchanger component, FIG. 8 shows the integration of a connection piece with a disk-shaped base into a laid structure of a layer of the heat exchanger component according to the invention, FIG. 9 is an illustration as in FIG. 8, but with the connection piece integrated.

DETAILED DESCRIPTION

Figure 4:
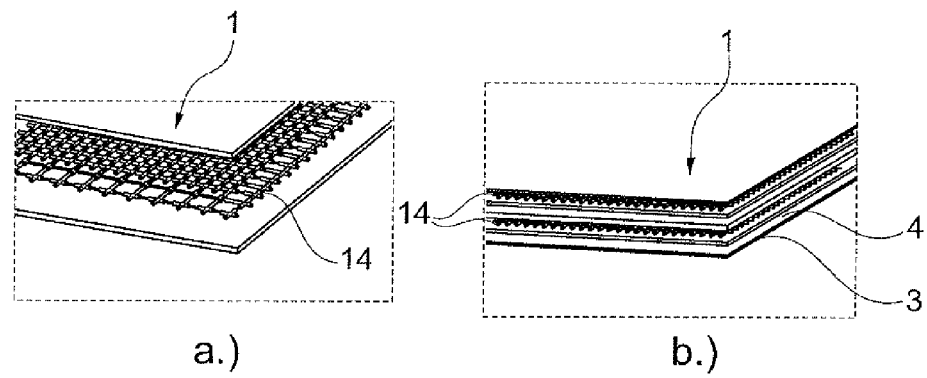
FIG. 4a is a detail illustration of a reinforcement for the mechanical strengthening of a layer of the heat exchanger component according to the invention.
FIG. 4b shows a sectional view of the heat exchanger component according to the invention with multiple reinforced layers.

Correspondingly to FIG. 1, a heat exchanger component 1 according to the invention of a temperature control system (not otherwise shown) of an electrical energy store 18, for example of a cooling system for a fraction battery of an electric or hybrid vehicle, has a carrier material 2, for example a fiber-reinforced plastic, and at least two layers 3, 4. In this case, the first layer 3 has an electrically insulating action, whereas the second layer 4 permits temperature control, that is to say cooling and/or heating of the electrical energy store 18. The first layer 3 may purely theoretically be formed from the carrier material 2 itself, or else may be encapsulated by said carrier material. As per FIG. 1, the heat exchanger component 1 according to the invention has multiple layers 5, 6 which are separated from one another for example by in each case one layer of the carrier material 2. In general, the carrier material 2 may be formed from plastic, in particular from fiber-reinforced plastic, or as an organic sheet, as a fiber-reinforced tape or organic sheet, or as a plastics laminate with integrated metal layers, for example with a metallic reinforcement. In this case, the heat exchanger component 1 may be produced for example by lamination, covering, pressing, pultrusion, sintering, thermoforming, injection molding or blow extrusion.

As already mentioned, for the carrier material 2, use may be made of plastics or fiber-reinforced composite materials which permit not only a relatively high strength but furthermore also a relatively low weight of the heat exchanger component 1. By means of the multi-layer construction of the heat exchanger component 1 according to the invention, it is furthermore possible for individual layers to be assigned individual functions, such as for example heating/cooling, electrical insulation or thermal insulation and/or diffusion sealing. The integration of functional materials such as for example carbon fibers, glass fibers or fibers in general may be performed already during the production of semifinished products, whereby subsequent shaping or deformation steps, for example for a fluid duct 7 (cf. FIG. 3), may be omitted. In this case, the fibers may be arranged in directional fashion in the respective layer or in the carrier material 2 or else may have an isotropic distribution, whereby the respective layer has isotropic strength characteristics, that is to say non-directional characteristics.

Viewing the layer 4 as per FIG. 2, it can be seen that, in the latter, there extends a fluid duct 7 through which a heat exchanger medium, for example a coolant, flows. Here, to be able to improve an exchange of heat with the object whose temperature is to be controlled, for example with the energy store, a heat-conducting structure 8 may be integrated, for example in the form of a nonwoven, knit, lattice or the like which exhibits good thermal conductivity, said structure being incorporated into the carrier material 2 or into the material surrounding the fluid duct 7. Metallic nonwovens or knits are particularly suitable for this purpose. By means of the heat-conducting structure 8, it is possible to achieve a particularly high rate of heat exchange from the heat exchanger medium flowing in the fluid duct 7 to a surface 9 of the second layer 4 or of the heat exchanger component 1, wherein, said surface 9 may include an enlarged surface 10, provided by for example ribs, teeth, spikes or fins arranged thereon, for the purposes of enlarging the surface and thus increasing the rate of heat exchange. In this way, the thermal conductivity and also the heat exchange and thus the cooling action can be considerably increased in relation to a plastics surface. If the heat-conducting structure 8 is in the form of a metal lattice, this may also perform the task of reinforcement, that is to say mechanical stiffening of the respective layer 4.

Viewing FIG. 3, it can be seen that said fluid duct 7 is integrated into the second layer 4, in which fluid duct the heat exchanger medium can flow. The fluid duct 7 is in this case delimited by two sub-layers 4a and 4b of the second layer 4, wherein the two sub-layers 4a and 4b (cf. FIGS. 3a and 3b) may be connected to one another by adhesive bonding or welding. Furthermore, a connection piece 11 (cf. FIGS. 3b and 3c) may be integrally formed, in particular molded, onto the second layer 4 or onto the sub-layer 4b, via which connection piece heat exchanger medium can be supplied to/discharged from the fluid duct 7. If it is the intention for the connection piece 11 to be of relatively long form, then it is for example possible for an insert part 12 with a disk-shaped base 13 (cf. FIG. 8) to be inserted into the connection piece 11 of the sub-layer 4b and to be sealingly connected thereto for example by welding or adhesive bonding.

Viewing FIGS. 4a and 4b, it is possible to see a reinforcement 14 in individual layers of the heat exchanger component 1, wherein the reinforcement 14 may for example be in the form of a metallic knit or nonwoven or mat, and generates the mechanical stiffening of the heat exchanger component 1.

Figure 5:
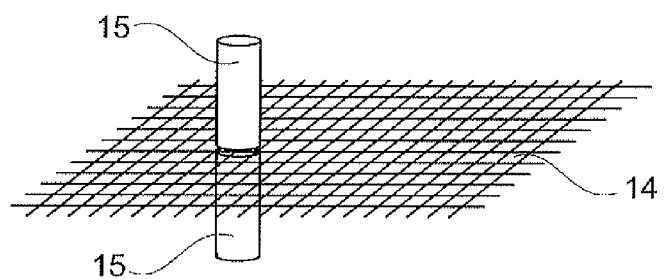
FIG. 5 shows a possibility for the formation of a recess for a subsequent inlet or outlet.

If a reinforcement 14 is provided, it is under some circumstances necessary for said reinforcement to be removed in the region of the connection piece 11 in order to produce the connection piece 11, for which purpose, as per FIG. 5, use may for example be made of a punch 15 which punches a corresponding opening into the reinforcement 14.

The production of such an opening or of a corresponding connection piece 11, 12 is illustrated in the method steps in FIGS. 7a to 7d. Firstly, in the first method step as per FIG. 7a, the plastics matrix 16 into which the reinforcement 14 is inlaid is punched out by means of the punch 15. The plastics fibers or the reinforcement 14 is in this case not damaged, as illustrated in FIG. 7b. Subsequently, in the method step from FIG. 7c, the reinforcement 14, that is to say the individual fibers, are deformed in order that, in the subsequent method step, illustrated in FIG. 7d, the connection piece 11 can be molded on. It is self-evidently possible here for the plastics matrix 16 to also be in the form of an organic sheet or tape.

Figure 6:
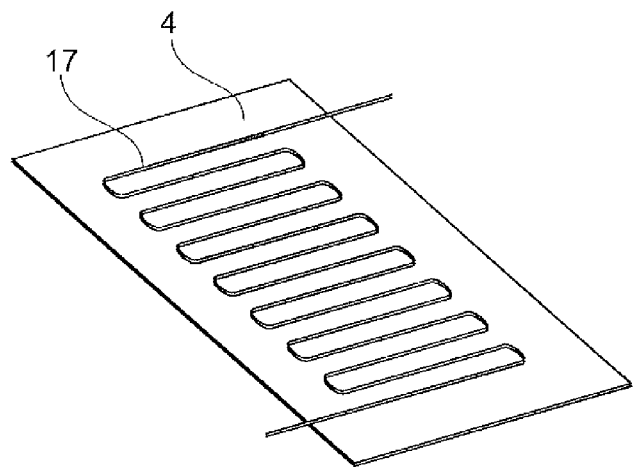
FIG. 6 shows a possible embodiment of a layer of the heat exchanger component according to the invention with electrically operable heating device.

Viewing FIG. 6 again, said figure shows an electrically operable heating device 17 which may likewise be arranged in the layer 4. Alternatively, for the heating of the electrical energy store, it is self-evidently possible for use to also be made of a corresponding heat exchanger medium which flows in the associated fluid duct 7.

Figure 10:
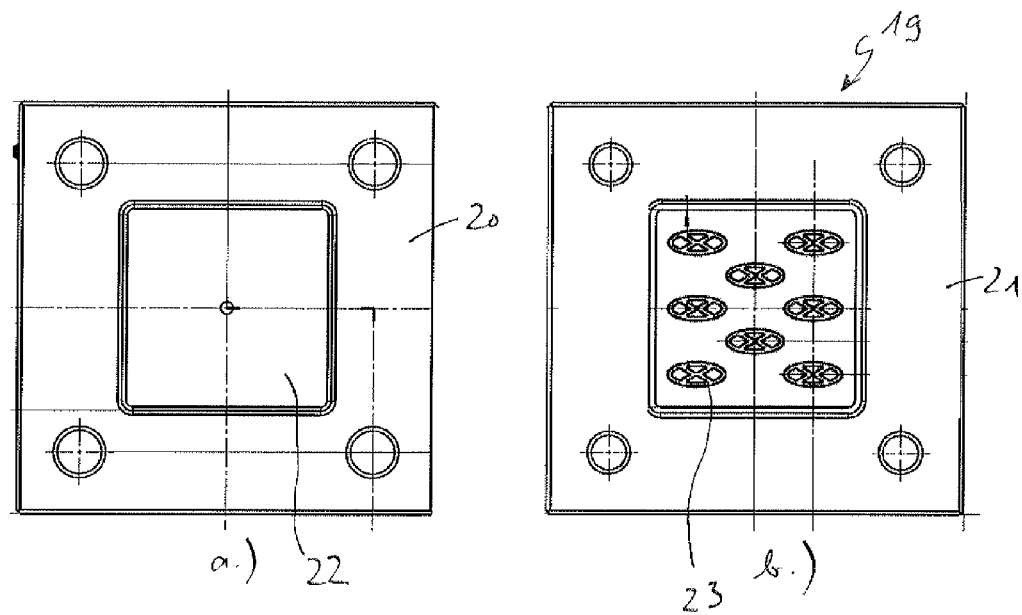
FIG. 10a shows a pressure plate of a stamping/pressing tool for the production of a fluid-conducting layer of a heat exchanger component.
FIG. 10b shows a die of a stamping/pressing tool for the production of a fluid-conducting layer of a heat exchanger component.
Figure 11:
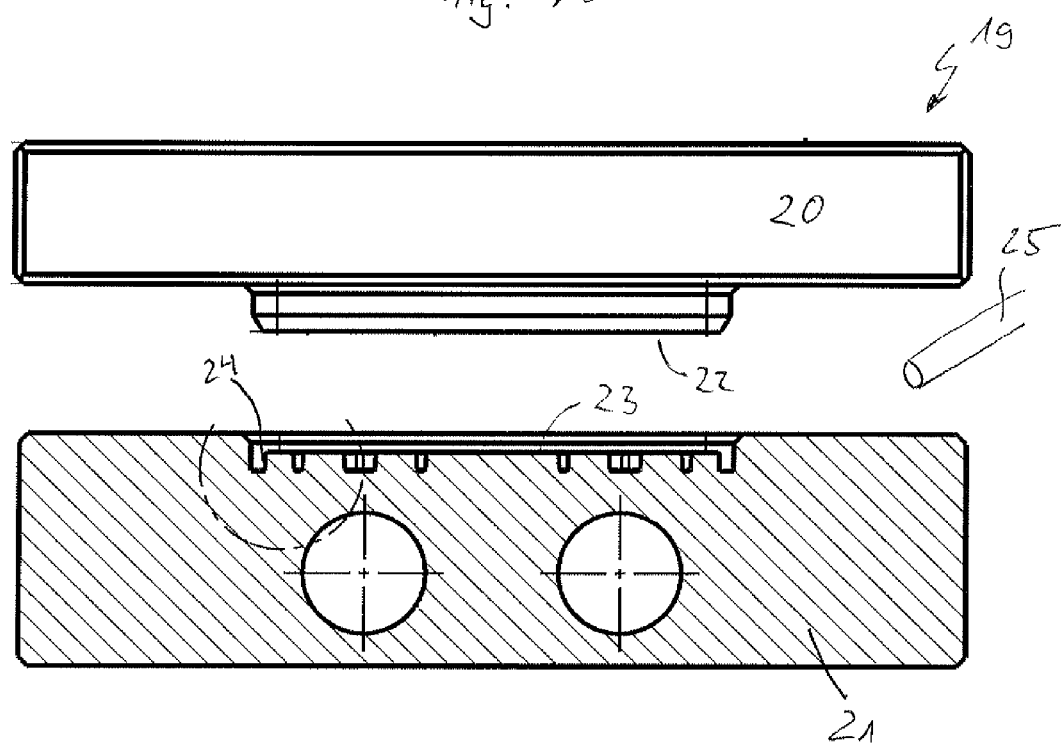
FIG. 11 shows a side view of the stamping/pressing tool for the production of a fluid-conducting layer of a heat exchanger component.

FIGS. 10 and 11 show a stamping/pressing tool 19 with in each case one pressure plate 20 and one associated die 21 for producing a half of an in particular fluid-conducting layer 4 of the heat exchanger component 1. The layer 4 can be assembled by virtue of two such halves being joined together, for example by being welded or adhesively bonded to one another.

By means of the stamping/pressing tool 19, it is for example possible to produce organic sheets into which additional fluid-conducting structures are formed. In this way, it is possible for a planar surface 22 to be formed on one side, and for a fluid guide 23 to be formed on the other side, without the need for additional material. This is realized by virtue of existing matrix material being forced out of the fiber-reinforced composite material into corresponding cavities 24 of the stamping/pressing tool 19. This eliminates the need for additional molding-on process step, or for additional components and/or material.

If, by means of the pressing/stamping of the so-called organic sheet, structures 23 are intended to be generated for which there is insufficient matrix material, the amount of matrix can be increased through the introduction of additional material. For this purpose, the additional material may be introduced in the form of a foil or as granulate. It would likewise be conceivable for a melt to additionally be introduced. Foils composed of the corresponding matrix material may be applied either directly during the production process of the organic sheet or in an additional process step or in a manner integrated into the pressing/stamping of the organic sheet.

Granulate or ground pieces of the corresponding matrix material may be introduced into the pressing/stamping tool 19 by a variety of methods: manually by way of a dosing system 25 or by way of a shaking function in the pressing/stamping tool 19 with an extractor apparatus. In the case of a manual feed, the individual granulate bodies are introduced in a defined number into the respective tool depressions provided for the same, which tool depressions form the desired structure 23 during the subsequent pressing/stamping process. By means of the dosing system 25, a defined amount of granulate can be dosed and pre-sorted in order for said granulate to subsequently be introduced into the depressions provided in the tool in a manually or automatically initiated manner during the process. Furthermore, it is possible for an undefined amount of granulate bodies to be applied to the die 21, such that, by way of a shaking function, the individual granulate bodies fall into the depressions/cavities 24. Subsequently, by way of an extractor apparatus, the excess granulate is removed from the surface of the die 21, is collected by way of a collecting apparatus, and is supplied back to the process again.

It is furthermore possible to use rotary table or sliding table technology in order to realize or improve accessibility to the stamping/pressing tool 19 for the feed of the granulate. Aside from foils and granulate, it is also possible, as mentioned above, for the additional material to be fed in the form of a melt to the pressing/stamping tool 19. In this case, the so-called organic sheet is placed into the pressing/stamping tool 19 and the desired structure is formed by way of the injection stamping process. The stamping/pressing tool 19 is self-evidently heatable.

With the heat exchanger component 1 according to the invention, it is made possible for the first time to replace the hitherto cumbersome separate manufacture of heat-exchanging layers and additional electrical insulation. The heat exchanger component 1 according to the invention has furthermore been considerably reduced in terms of weight in relation to conventional heat-exchanging components.

The invention claimed is:

1. A heat exchanger component of a temperature control system of an electrical energy store, comprising: a carrier material composed of plastics and at least two layers, the at least two layers including a first layer composed of an electrically insulating material and a second layer facilitating temperature control via at least one of cooling and heating the electrical energy store, the first layer and the second layer arranged in a multi-layer construction one on top of the other in a stacking direction and separated from one another via the carrier material;
wherein the second layer includes a heat-conducting structure at least partially embedded within and integrated into a material of the second layer; and
wherein the electrically insulating material of the first layer defines a plastics surface covering the first layer on a side facing away from the second layer in the stacking direction.

2. The heat exchanger component as claimed in claim 1, wherein at least one of:
the carrier material includes a fiber-reinforced plastic; and
the carrier material is at least one of an organic sheet, a fiber-reinforced tape, a fiber-reinforced organic sheet and a plastics laminate including at least one integrated metal layer.

3. The heat exchanger component as claimed in claim 2, wherein the second layer includes an electrically operable heating device.

4. The heat exchanger component as claimed in claim 1, wherein the second layer includes a fluid duct for communicating a flow of a heat exchanger medium, and wherein the material of the second layer surrounds the fluid duct.

5. The heat exchanger component as claimed in claim 4, wherein the second layer further includes at least one connection piece for at least one of a supply and a discharge of the heat exchanger medium.

6. The heat exchanger component as claimed in claim 1, further comprising a mechanically strengthening reinforcement material embedded within at least one of the carrier material and the at least two layers.

7. The heat exchanger component as claimed in claim 1, wherein the second layer includes an enlarged surface.

8. The heat exchanger component as claimed in claim 1, wherein the heat exchanger component is produced by lamination, covering, pressing, pultrusion, sintering, thermoforming, injection molding or blow extrusion.

9. An electrical energy store of a motor vehicle, comprising a heat exchanger component including:
a carrier material composed of plastics and at least two layers, the at least two layers including a first layer composed of an electrically insulating material and a second layer facilitating temperature control via at least one of cooling and heating the electrical energy store, the first layer and the second layer arranged in a multi-layer construction one on top of the other in a stacking direction and separated from one another via the carrier material;
the second layer including a heat-conducting structure at least partially embedded within and integrated into a material of the second layer;
the electrically insulating material of the first layer defining a plastics surface covering the first layer on a side facing away from the second layer in the stacking direction; and
wherein the heat exchanger component at least one of is in heat-exchanging contact with a housing of the energy store and forms a housing part of the housing of the energy store.

10. The energy store as claimed in claim 9, wherein the second layer has an enlarged surface provided by a surface enlarging structure protruding outwardly from and extending across a surface of the second layer facing away from the first layer, the surface enlarging structure including at least one of a rib and a fin.

11. The heat exchanger component as claimed in claim 1, wherein the heat-conducting structure is one of a metallic nonwoven, a hybrid nonwoven, a knit, and a lattice.

12. The heat exchanger component as claimed in claim 4, wherein the fluid duct is defined between two sub-layers of the second layer, and the heat-conducting structure includes a metal lattice embedded in the material of the second layer surrounding the fluid duct, and wherein the metal lattice extends transversely through the fluid duct with respect to a through-flow direction of the flow of the heat exchanger medium from a first of the two sub-layers to a second of the two sub-layers.

13. The heat exchanger component as claimed in claim 12, wherein the second layer includes an enlarged surface provided by a plurality of surface enlarging structures arranged on a surface of the second layer facing away from the first layer, the plurality of surface enlarging structures extending outwardly from the surface of the second layer in a direction away from the fluid duct and arranged spaced apart from one another along the surface of the second layer, and wherein the plurality of surface enlarging structures include at least one of ribs and fins.

14. The heat exchanger component as claimed in claim 7, wherein the enlarged surface is provided by a surface enlarging structure protruding outwardly from and extending across a surface of the second layer, and wherein the surface enlarging structure is arranged in a plurality of rows extending transversely to the stacking direction.

15. The heat exchanger component as claimed in claim 14, wherein the surface enlarging structure includes a plurality of fins or ribs protruding outwardly from the surface of the second layer and arranged spaced apart from one another along the surface of the second layer.

16. The heat exchanger component as claimed in claim 15, wherein:

the second layer defines an integrated fluid duct for communicating a flow of a heat exchanger medium, the material of the second layer surrounding the fluid duct; and the plurality of fins or ribs protrude outwardly from the surface of the second layer in a direction away from the fluid duct.

17. The heat exchanger component as claimed in claim 12, wherein the heat-conducting structure further includes a plurality of fins embedded in the material of the second layer and penetrating through a surface of the second layer facing away from the first layer.

18. The heat exchanger component as claimed in claim 1, wherein the first layer is encapsulated by the carrier material, the carrier material defining the plastics surface covering the first layer on the side facing away from the second layer.

19. The heat exchanger component as claimed in claim 1, wherein the second layer includes a first sub-layer, a second sub-layer, and a fluid duct disposed between the first sub-layer and the second sub-layer relative to the stacking direction, and wherein the heat-conducting structure includes a metallic knit or nonwoven embedded within the second sub-layer and extending transversely to the stacking direction.

20. The energy store as claimed in claim 10, wherein the surface enlarging structure is in direct contact with at least one of the housing of the energy store and an exterior space surrounding the energy store.

* * * * *